US012788147B2

(12) United States Patent
Jha et al.

(10) Patent No.: US 12,788,147 B2
(45) Date of Patent: Nov. 10, 2026

(54) STRUCTURES WITH INTERLOCKING HEMS AND METHODS OF FORMING SAME

(71) Applicant: Honest Structures LLC, Evanston, IL (US)

(72) Inventors: Hemant Jha, Evanston, IL (US); Kopal Kulkarni, Evanston, IL (US)

(73) Assignee: Honest Structures LLC, Evanston, IL (US)

( * ) Notice: Subject to any disclaimer, the term of this patent is extended or adjusted under 35 U.S.C. 154(b) by 133 days.

(21) Appl. No.: 18/816,741

(22) Filed: Aug. 27, 2024

(65) Prior Publication Data

US 2024/0415287 A1 Dec. 19, 2024

Related U.S. Application Data

(63) Continuation of application No. 17/727,399, filed on Apr. 22, 2022, now Pat. No. 12,075,920.

(60) Provisional application No. 63/178,187, filed on Apr. 22, 2021.

(51) Int. Cl.
*A47C 7/02* (2006.01)
*F16B 37/16* (2006.01)

(52) U.S. Cl.
CPC ................ *A47C 7/02* (2013.01); *A47C 7/024* (2013.01); *F16B 37/16* (2013.01)

(58) Field of Classification Search
CPC ............ A47C 7/02; A47C 7/024; F16B 37/16
USPC ......................... 297/233, 248, 440.1, 440.14
See application file for complete search history.

(56) References Cited

U.S. PATENT DOCUMENTS

| | | | | | |
|---|---|---|---|---|---|
| 162,707 | A | * | 4/1875 | Spencer | A47C 7/024 297/233 |
| 177,548 | A | * | 5/1876 | Peard | A47C 1/124 297/248 |
| 636,854 | A | * | 11/1899 | Saveland | A47C 11/00 297/244 |
| 1,335,973 | A | * | 4/1920 | Kesselman | A47C 1/023 297/107 |
| 2,164,715 | A | * | 7/1939 | Krainbill | A47C 13/005 297/440.22 |
| 2,264,491 | A | * | 12/1941 | Ward | A47C 15/002 297/233 |
| 2,466,204 | A | * | 4/1949 | Brown | A47C 17/045 297/440.16 |
| 2,572,732 | A | * | 10/1951 | Keklen | A47C 11/005 52/36.2 |
| 2,606,599 | A | * | 8/1952 | Santosuosso | A47C 3/16 297/188.1 |
| 2,699,202 | A | * | 1/1955 | Leary | A47C 17/13 297/440.22 |
| 2,793,685 | A | * | 5/1957 | Spitz | A47C 17/34 297/411.27 |

(Continued)

*Primary Examiner* — Rodney B White
(74) *Attorney, Agent, or Firm* — Much Shelist P.C.

(57) ABSTRACT

A structure includes a first body member including a first interfacing side edge and a first interconnecting component at the first interfacing side edge and a second body member identical to the first body member, the second body member including a second interfacing side edge and a second interconnecting component at the second interfacing side edge. The first interconnecting component engages with the second interconnecting component to secure the first body member and the second body member together.

8 Claims, 8 Drawing Sheets

(56) References Cited

U.S. PATENT DOCUMENTS 3,011,227 A * 12/1961 Vogel .................... A47C 1/124
297/248
3,658,382 A * 4/1972 Anderson ............... F16B 12/00
403/219
3,669,494 A * 6/1972 Lohmeyer ............ A47C 13/005
297/440.14
3,784,251 A * 1/1974 Persson .................. A47C 1/124
297/411.28
3,826,206 A * 7/1974 Ruggles ................... A47C 4/02
411/517
3,944,282 A * 3/1976 Nakamura ........... A47C 13/005
297/440.14
3,973,800 A * 8/1976 Kogan ................... A47C 7/002
297/135
4,900,090 A * 2/1990 Davis ....................... A47C 5/12
403/381
5,069,506 A * 12/1991 Wieland ................... A47C 4/02
297/440.1
5,088,180 A * 2/1992 Nottingham ............ F16B 12/24
29/469
5,509,720 A * 4/1996 Croom ................... A63H 33/04
297/440.16
5,775,778 A * 7/1998 Riley ..................... A47C 7/425
297/226
6,217,120 B1 * 4/2001 Pugliese .................. A47C 4/02
297/440.1
6,241,317 B1 * 6/2001 Wu .......................... A47C 4/02
297/440.1
6,279,997 B1 * 8/2001 Moore ..................... A47C 4/02
297/440.13
6,494,540 B1 * 12/2002 Tornero ................. A47C 7/282
297/452.56
6,824,220 B1 * 11/2004 Davison ................. A47C 17/34
297/440.14
6,942,298 B2 * 9/2005 Harrison ................ A47C 17/04
297/440.1
7,883,149 B1 * 2/2011 Weiss ................... B60N 2/2806
297/256.16
8,152,238 B2 * 4/2012 Timme ..................... B60N 2/28
297/440.13
8,162,396 B2 * 4/2012 Edwards ................ A47C 15/00
297/440.22
8,282,307 B1 * 10/2012 Brown ..................... A47C 4/03
403/231
8,465,101 B1 * 6/2013 Alvarez ................. A47B 97/00
297/463.2
11,672,351 B2 * 6/2023 Clabots .................. A47C 1/124
297/248
11,882,939 B2 * 1/2024 Gansow ................. A47C 31/02
12,075,920 B2 * 9/2024 Jha ........................... A47C 4/02
2001/0052723 A1 * 12/2001 Wu ........................ A47C 4/022
297/440.1
2002/0043865 A1 * 4/2002 Bruschi .................... A47C 4/03
297/440.1
2002/0093235 A1 * 7/2002 Niederman ............ A47C 4/028
297/440.22
2003/0011231 A1 * 1/2003 Guillot ................. A47C 13/005
297/440.1
2004/0095000 A1 * 5/2004 Durling ................ A47C 13/005
297/188.2
2004/0200832 A1 * 10/2004 Moon ................ B65D 11/1873
220/4.28
2005/0179303 A1 * 8/2005 Owens ..................... A47C 7/42
297/440.1
2005/0225153 A1 * 10/2005 Ou ......................... A47C 17/00
297/440.14
2006/0103220 A1 * 5/2006 Wade ....................... A47C 4/02
297/440.14
2007/0063112 A1 * 3/2007 Patterson ................ F16B 12/46
297/440.1
2007/0132301 A1 * 6/2007 Yu ............................ A47C 4/02
297/440.23
2007/0273181 A1 * 11/2007 Wechter ................. A47K 3/122
297/119
2009/0045666 A1 * 2/2009 Westendorf .......... A47C 13/005
297/440.1
2010/0207442 A1 * 8/2010 Hrib ..................... A47C 13/005
297/440.14
2010/0244537 A1 * 9/2010 Chen ........................ A47C 4/02
5/653
2011/0133533 A1 * 6/2011 Herzberg ............. B60N 2/2806
297/239
2011/0254341 A1 * 10/2011 Potter ...................... A47C 4/02
297/440.1
2012/0080910 A1 * 4/2012 Davis ...................... F16B 12/10
211/186
2012/0187737 A1 * 7/2012 Blair ........................ A47C 4/02
297/440.1
2012/0248843 A1 * 10/2012 Sinchok ................... A47C 4/02
297/440.1

* cited by examiner

STRUCTURES WITH INTERLOCKING HEMS AND METHODS OF FORMING SAME

CROSS-REFERENCE TO RELATED APPLICATIONS

This application comprises a continuation application of U.S. application Ser. No. 17/727,399 filed Apr. 22, 2022, now U.S. Pat. No. 12,075,920 B2, which claims the benefit of priority to U.S. Provisional Application 63/178,187 filed Apr. 22, 2021, the entireties of which are incorporated herein by reference.

BACKGROUND OF THE INVENTION

This disclosure is generally directed to a structure, such as but not limited to a furniture item, having at least a first body member and a second body member, in which the body members can readily and easily lock together to form the structure. More specifically, the present invention relates to a furniture item including identical first and second body members, each having an interlocking component that interlocks with the interlocking component of the other body member.

An item that can hold or support an animate or inanimate object is often times referred to as a furniture item. A furniture item can exist inside or outside of the home as any item of support, including a chair, table, bedframe, shelf, screen, counter, door, cabinet, etc. A furniture item can have downward extending supports and a lateral backing member. The supports or legs can include rollers at the bottom of each leg, and the back can be integrated into a seat or table top.

Conventional furniture items are made from different components. For example, the legs or back can be made separate from the seat. If the furniture item is a bedframe, for example, the cross members of the bedframe are typically manufactured separately from the perimeter frame member. The different components are generally made of different materials using different manufacturing processes. The materials can include steel, aluminum, wood, plastic, and soft materials like fabric and foam. Additionally, building structures ranging from movable walls and interior partition systems to outdoor decks and platforms may also be constructed using various components.

Almost all conventional mass-produced furniture items and many building structures or elements have different component materials made possibly in different factories by different manufacturing processes and by different manufacturers. The mechanical and chemical characteristics of each component are different, and the mechanisms for attaching dissimilar parts to each other often require the use of additional fastener materials, such as glues, adhesives, braces, screws, and hardware. The components are held together through time-intensive welds if the components are made of steel or aluminum. There is therefore significant cost and complexity in working with different components, each having dissimilar materials. If a component fails, a new component must be created by taking apart the item and repairing that item with the new component. Repairs in the field are expensive, and the backlog for obtaining the replacement component is lengthy. Therefore, refurbishment of a furniture item having dissimilar components is difficult if the components are no longer manufactured. As a result, at the end of life for a furniture item or a component in that furniture item, the furniture item is destined for the landfill, which creates a significant environmental problem.

The manufacture of different components using different materials relies on the assembly of those components into a structure somewhere along the supply chain. In most instances, the components are assembled by a dealer or possibly by the end user in the field. The complexity of coupling together different components made of different materials is not only time consuming, but sometimes extremely difficult. The assembler must rely upon complex supply chains that can often involve transnational shipping and complex logistics, as well as warehousing different components made by different manufacturers possibly at different times. If the assembler determines a component to be defective, then he or she must wait until the replacement component is available. Replacing the defective component generally requires special tools.

A need exists in improving the manufacture and assembly of furniture items and other structures. That need involves reducing the costs of component manufacture, utilizing environmentally-friendly, recyclable materials and products, minimizing the shipping and logistics of manufactured components, and also minimizing the cost and lead time in assembling the furniture item. Lower assembly costs and shorter lead times can be achieved by minimizing assembly complexity and eliminating the need for special tools.

BRIEF SUMMARY OF THE INVENTION

To meet the needs noted above, the present disclosure provides a simple and readily assembled structure such as a furniture item or building element that does not require any tools or complex hardware for assembly. The costs of manufacture are also minimized since the component portions of the structure are made of the same material and can be made identical to one another. Each body member or portion can be made in a mass production scale of the same material and of a continuous, contiguous, and integral (i.e., "unibody") construction. Each portion is therefore interchangeable as it is being assembled, preferably by an end user absent the need for any assembly tools whatsoever. While the examples described in the disclosure herein utilize a furniture item to demonstrate the advantages of the interlocking hems, the interlocking hems may be incorporated into other structures such as, but not limited to, internal and external building structures ranging from movable walls, interior partition systems, and floor decking to outdoor decks and platforms and roof decking.

The furniture item or structures described herein can therefore be mass produced of identical components and of identical materials for each component or portion. Each manufactured portion can then be shipped to the assembler with minimal manufacture delay or shipment lead time. Assembly is so easy that an end user can assemble furniture portions securely together to form the furniture item without any tools whatsoever. If any portion of the furniture item is defected, the replacement component is readily obtained since the portions of the furniture item can be made identical to one another. It is also much easier to cleanly and cost-effectively recycle the item at the end of its life since each component is made of the same material for ease in recycling. Since there are no welds, glues, slides, braces, screws, fasteners, etc. used to permanently connect the portions, the item can be more easily refurbished and recycled since it is more cost effective to recycle and therefore increases the chance that recycling will occur.

According to one example, an item such as a furniture item or structural element comprises a first body member and a second body member. In some embodiments, the second body member is identical to the first body member.

Each of the first and second body members includes an interlocking component. Specifically, each body member includes an interfacing side edge that interfaces with the interfacing side edge of the mating body member. Each interlocking component includes a wall extending from the interfacing side edge, the wall including a coupling flange extending outwardly and downwardly from a wall edge to define a receiving cavity between the coupling flange and the wall. The wall also includes an engaging wall portion adjacent to the coupling flange, the engaging wall portion being free from the coupling flange. In one embodiment, the wall has a wall length and each of a coupling flange length and an engaging portion length are about half of the wall length.

When the first and second body members are secured together, the interconnecting components are engaged. The coupling flange of the first body member receives the engaging portion of the second body member while the coupling flange of the second body member simultaneously receives the engaging portion of the first body member.

Each body member includes a top portion with the interfacing side edges. In some embodiments, the top portion includes one or more side surfaces along one or more edges adjacent to the interfacing side edge, and the side surfaces include first and second planar members adjacent to the interfacing side edge. When the first and second body members are facing one another and are interconnected, the first planar member of the first body member is positioned adjacent to the second planar member of the second body member. Similarly, the second planar member of the first body member is positioned adjacent to the first planar member of the second body member. A securing means such as a threaded bold and wing nut can extend through aligned openings of the adjacent planar members of the connected body members to further secure the body members together.

In a first embodiment of the invention, a structure includes a first body member including a first interfacing side edge and a first interconnecting component at the first interfacing side edge and a second body member including a second interfacing side edge and a second interconnecting component at the second interfacing side edge. The first interconnecting component engages with the second interconnecting component to secure the first body member and the second body member together.

In a second embodiment of the invention, each of the first interconnecting component and the second interconnecting component includes a wall having a wall length, a coupling flange extending from a wall edge and forming a receiving cavity between the coupling flange and the wall, and an engaging portion. In a further embodiment of the application, the receiving cavity of the first interlocking component receives the engaging portion of the wall of the second interlocking component, and wherein the receiving cavity of the second interlocking component receives the engaging portion of the wall of the first interlocking component.

In a still further embodiment, the first body member is of a unibody construction that is a first half of the structure, and wherein the second body member is of a unibody construction that is a second half of the structure. In another embodiment, the second body member is identical to the first body member.

In a further embodiment, each of the first and second body members includes a top portion including a side edge connected to the interfacing side edge, wherein each top portion includes a side surface extending from the side edge, wherein each top portion includes first and second planar members extending from the side surface adjacent to the interfacing side edge, and wherein the first and second planar members include openings such that the openings of abutting planar members align when the first and second body members are secured together and each pair of abutting planar members receives a securing member. In some embodiments, the securing members comprise a threaded bolt and wing nut.

In another embodiment of the invention, a structure includes a first body member that includes a first wall comprising a first engaging portion and a first coupling flange and a second body member that includes a second wall comprising a second engaging portion and a second coupling flange. The first coupling flange partially surrounds the second engaging portion and the second coupling flange partially surrounds the first engaging portion when the first body member is joined together with the second body member. In some embodiments, the first body member is a first half of the structure, and wherein the second body member is a second half of the structure.

In a still further embodiment of the invention, a method of forming a structure is provided. The method includes the steps of: providing a first body member that includes a first wall comprising a first engaging portion and a first coupling flange; providing a second body member that includes a second wall comprising a second engaging portion and a second coupling flange; positioning the second body member adjacent to the first body member such that the second wall is transverse to the first wall; and rotating the second body member such that the second coupling flange receives the first engaging portion of the first wall and the first coupling flange receives the second engaging portion of the second wall.

In some embodiments, the rotating step comprises rotating the first body member against the second body member around a central axis of the structure to be formed.

Additional features and advantages of the disclosed apparatus, system, and method are described in, and will be apparent from, the following detailed description and figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

FIGS. 1-8 illustrate an example structure that, when easily and readily assembled, can hold or support an animate or inanimate object or otherwise provide structural support. The structure illustrated in the figures is a furniture item 100, specifically a side table including a tabletop and four legs. The furniture item 100 includes identical first and second body members 102*a*, 102*b* that interlock together along interlocking components 104*a*, 104*b* thereof to form the furniture item 100. As used throughout the specification provided herein, each reference number may be supplemented by a letter "a" or a letter "b" to designate and differentiate between an element of a first body member 102*a* and a second body member 102*b*. Accordingly, for each element shown and described, the drawings may use a reference number with no supplemental letter when only one body member 102 is shown in a given drawing, and may use a reference number supplemented by the letter "a" or the letter "b" when more than one body member 102*a* and 102*b* is shown in a given drawing. For example, in FIG. 1 the legs 108-1 and 108-2 are represented by 108*a*-1 (a first leg of a first body member 102*a*), 108*b*-1 (a first leg of a second body member 102*b*), 108*a*-2 (a second leg of the first body member 102*a*), and 108*b*-2 (a second leg of the second body member 102*b*). Although the description herein references a furniture item, the inventive concepts described herein may be incorporated and/or applied to any structure as will be as would be understood by one of ordinary skill in the art.

Figure 1:
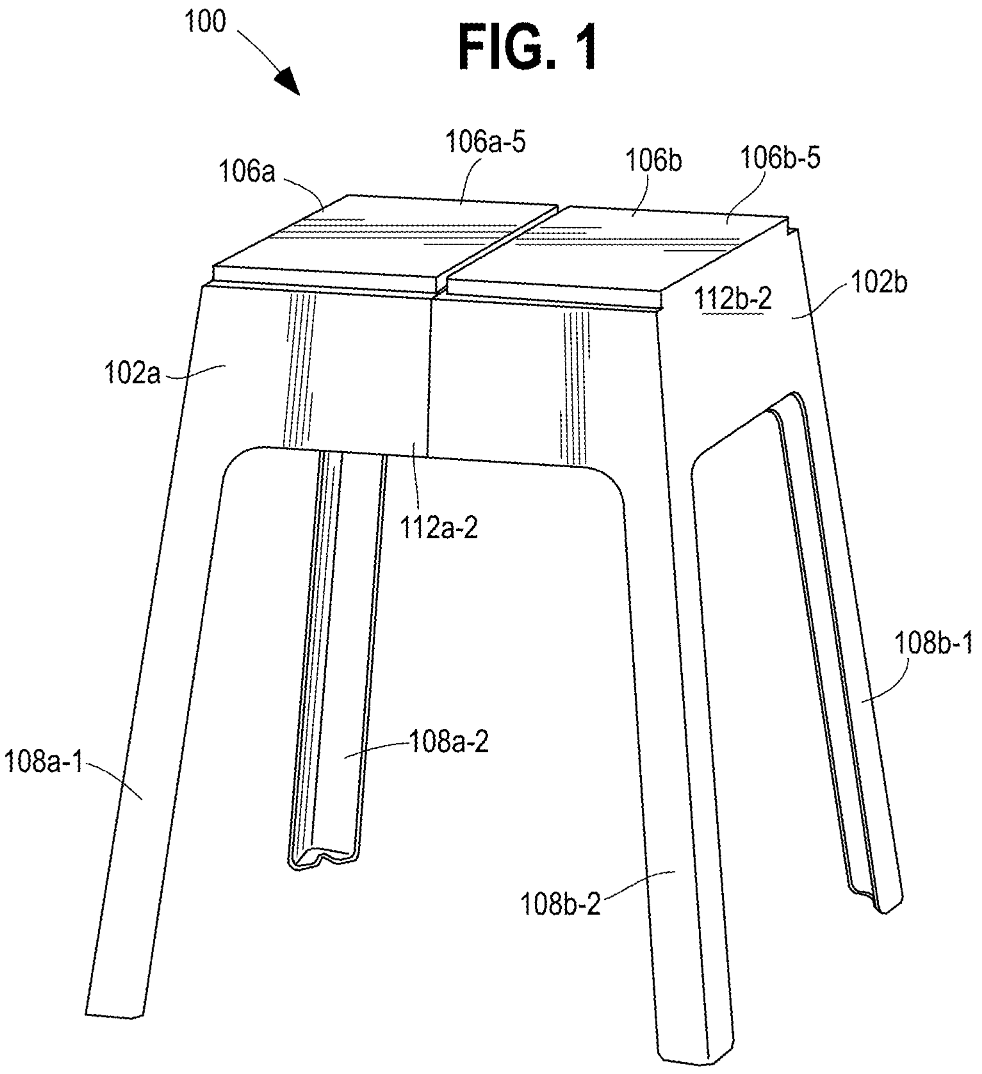
FIG. 1 is a perspective view from above of a furniture item according to the present application.
Figure 2:
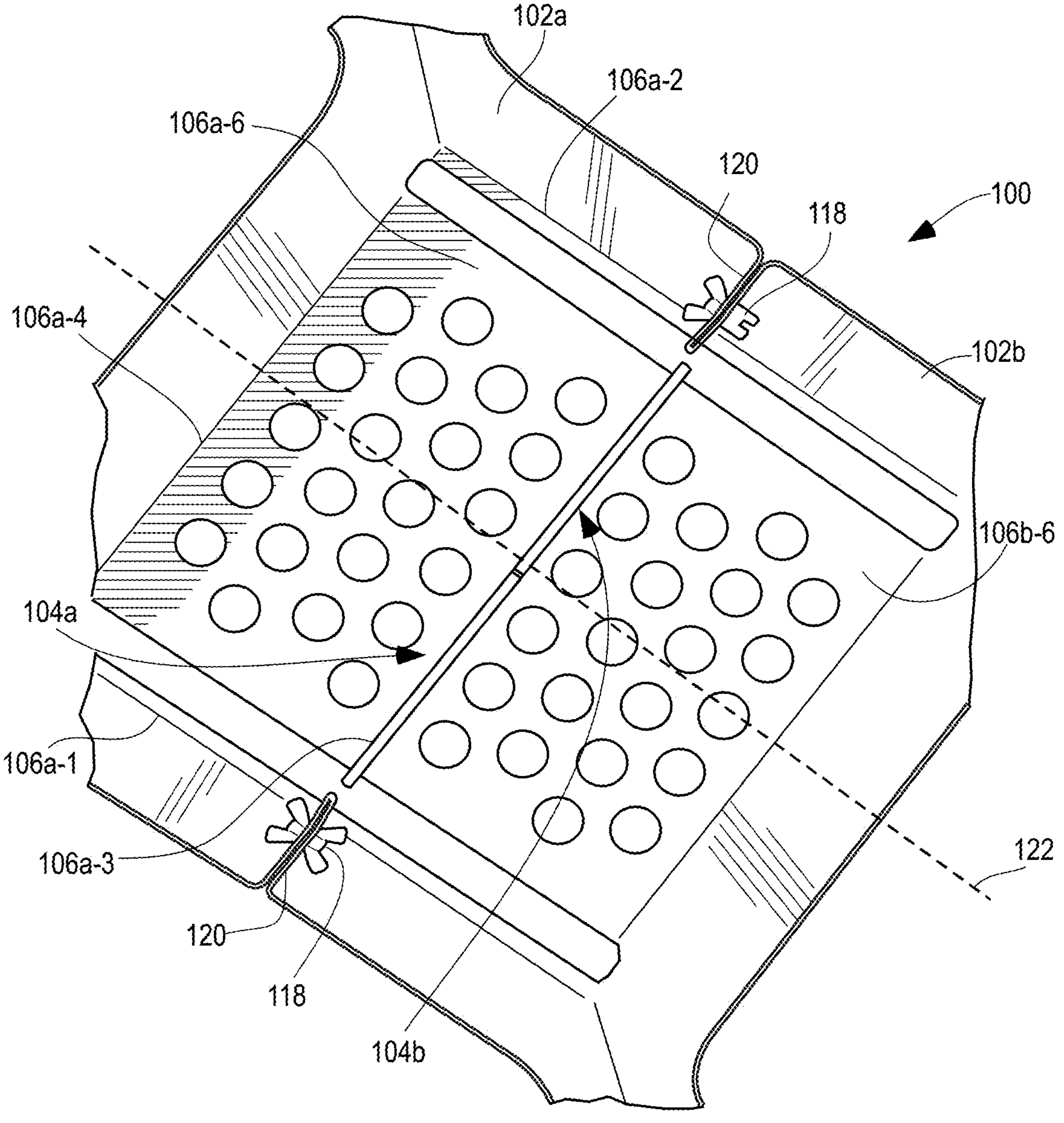
FIG. 2 is a bottom plan view of the furniture item of FIG. 1.

Each body member 102 includes a top portion 106 including front and back sides 106-1, 106-2 with an interfacing side edge 106-3 and an outer side 106-4 spanning between the front and back sides 106-1, 106-2, the sides surrounding an upper surface 106-5 and a bottom surface 106-6. Two legs 108-1, 108-2 are formed at the juncture of the outer side 106-4 with the front and back sides 106-1, 106-2. In the illustrated embodiment, the top portion 106 includes elongated openings along the front and back sides 106-1, 106-2 as well as holes extending through the upper and bottom surfaces 106-5, 106-6 as shown in FIG. 2. Such elongated openings and/or holes are optional, and other embodiments may comprise solid, textured, or perforated surfaces as needed or desired.

Referring to FIGS. 2-5, the top portion 106 of each body member 102 includes an interlocking component 104 along the interfacing side edge 106-3 thereof. The interlocking component 104 includes a wall 110 that extends the length of the interfacing side edge 106-3. The wall 110 is formed integrally with the interfacing side edge 106-3 at approximately 90 degrees relative thereto. In other embodiments, the wall 110 and other elements of the interconnecting component 104 is removably attachable to the body member 102. The wall 110 includes an outer wall surface 110-1 and an inner wall surface 110-2 with a wall edge 110-3 opposite of the interfacing side edge 106-3.

In the illustrated embodiment, the wall 110 has a wall length that is the same length of the interfacing side edge 106-3. In other embodiments, the wall 110 may extend along a portion of the length of the interfacing side edge 106-3 instead of the entire length. In still other embodiments, the wall 110 may include one or more openings or slots separating the wall into wall portions. Each body member 102 also includes three side surfaces 112-1, 112-2, 112-3 (see FIG. 1) extending downwardly from the top portion 106 along the front side 106-1, back side 106-2, and outer side 106-3.

Figure 3:
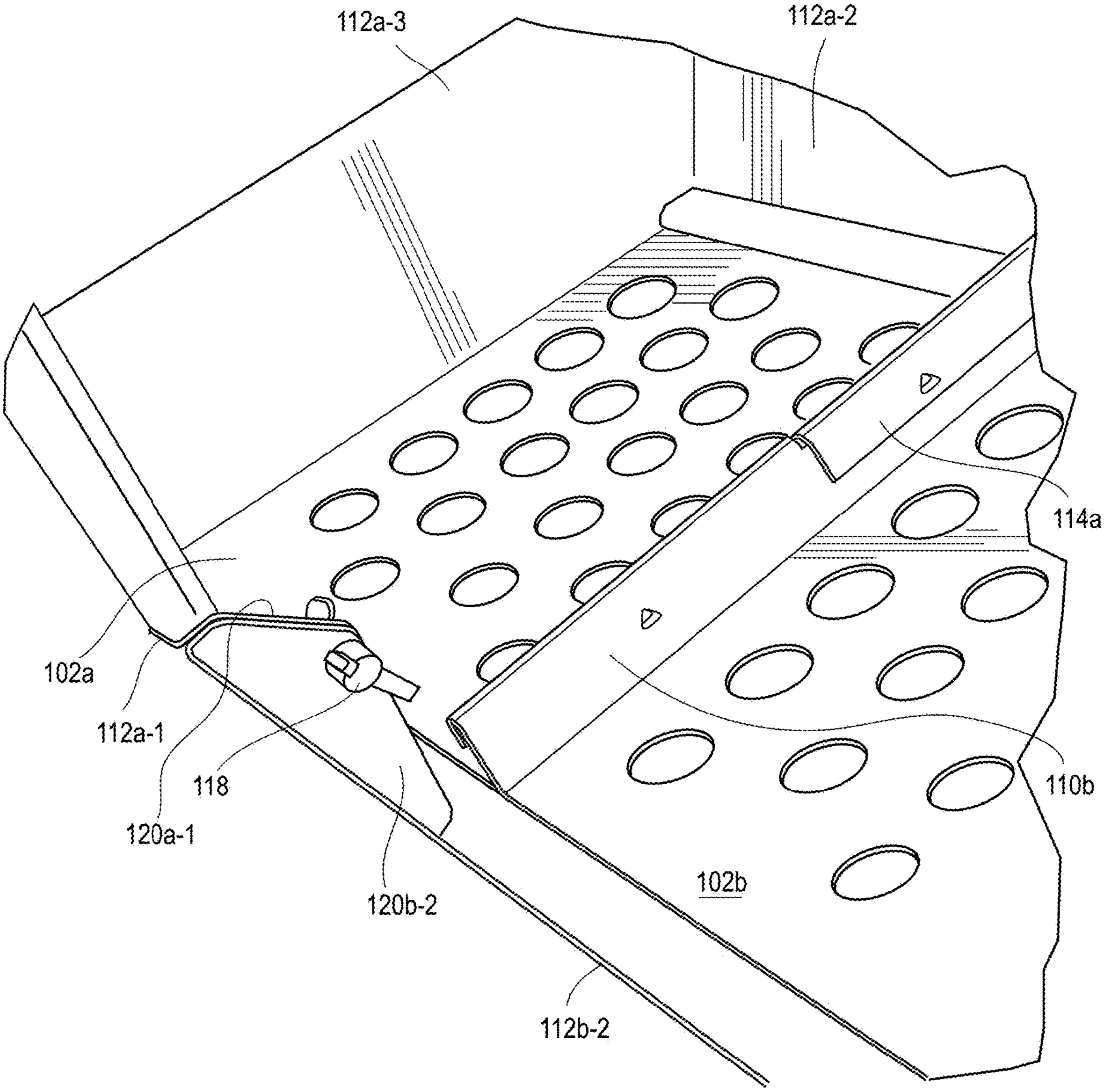
FIG. 3 is an enlarged perspective view of the interlocking overlaps of the furniture item of FIG. 1.
Figure 4:
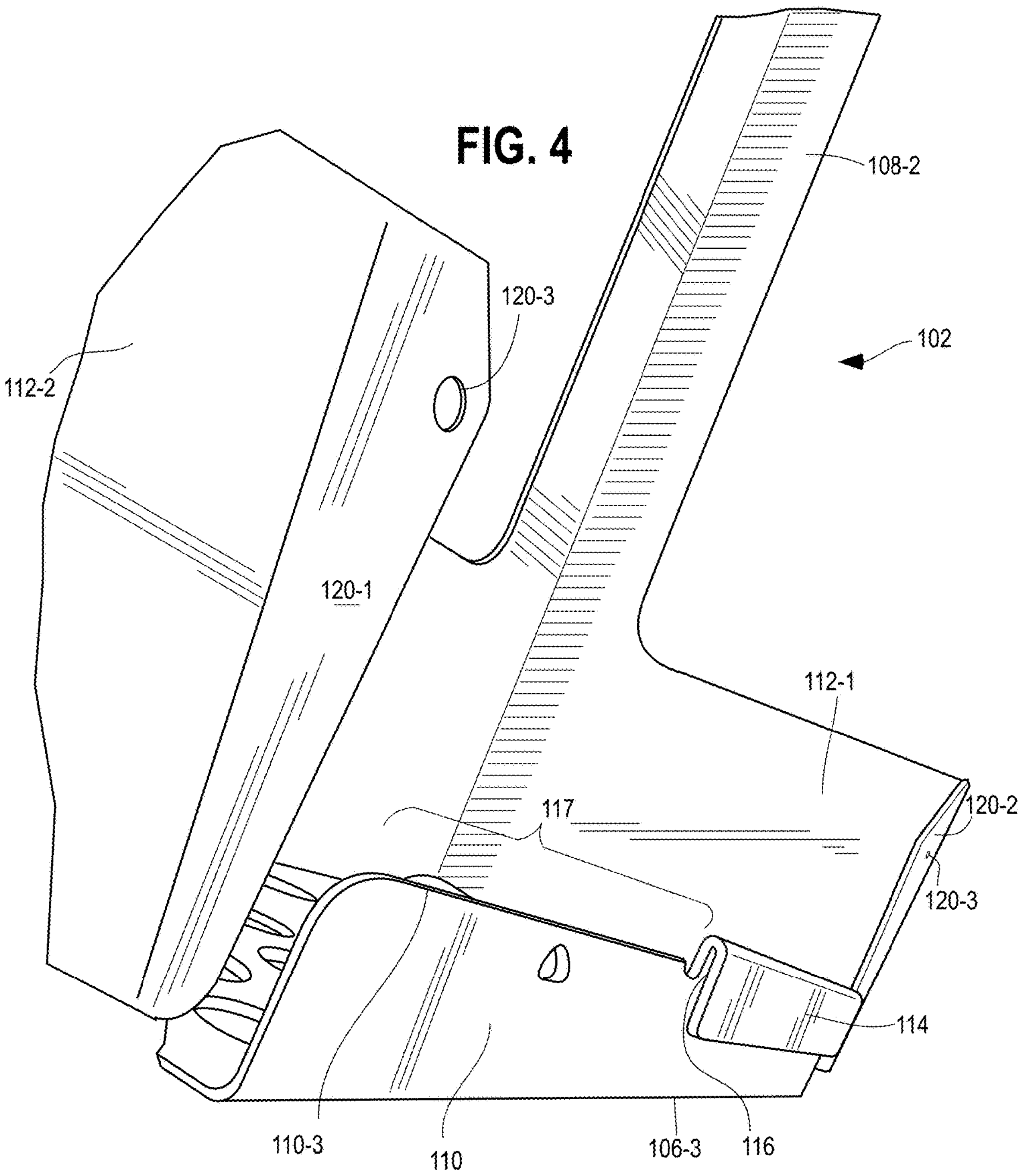
FIG. 4 is a perspective view of an underside of a body member of the furniture item of FIG. 1.

Referring to FIGS. 3 and 4, a coupling flange 114 extends outwardly and downwardly from the wall edge 110-1 to form a receiving wall slot 116 against the outer wall surface 110-1 of the wall 110. In the illustrated embodiment, the coupling flange 114 has a coupling flange length that is less than the wall length of the wall 110. In one embodiment, the coupling flange length is about half of the wall length. An engaging portion 117 of the wall 110 free from the coupling flange 114 is available for connecting with the interconnecting component 104 of the other body member 102 as described below.

Figure 5:
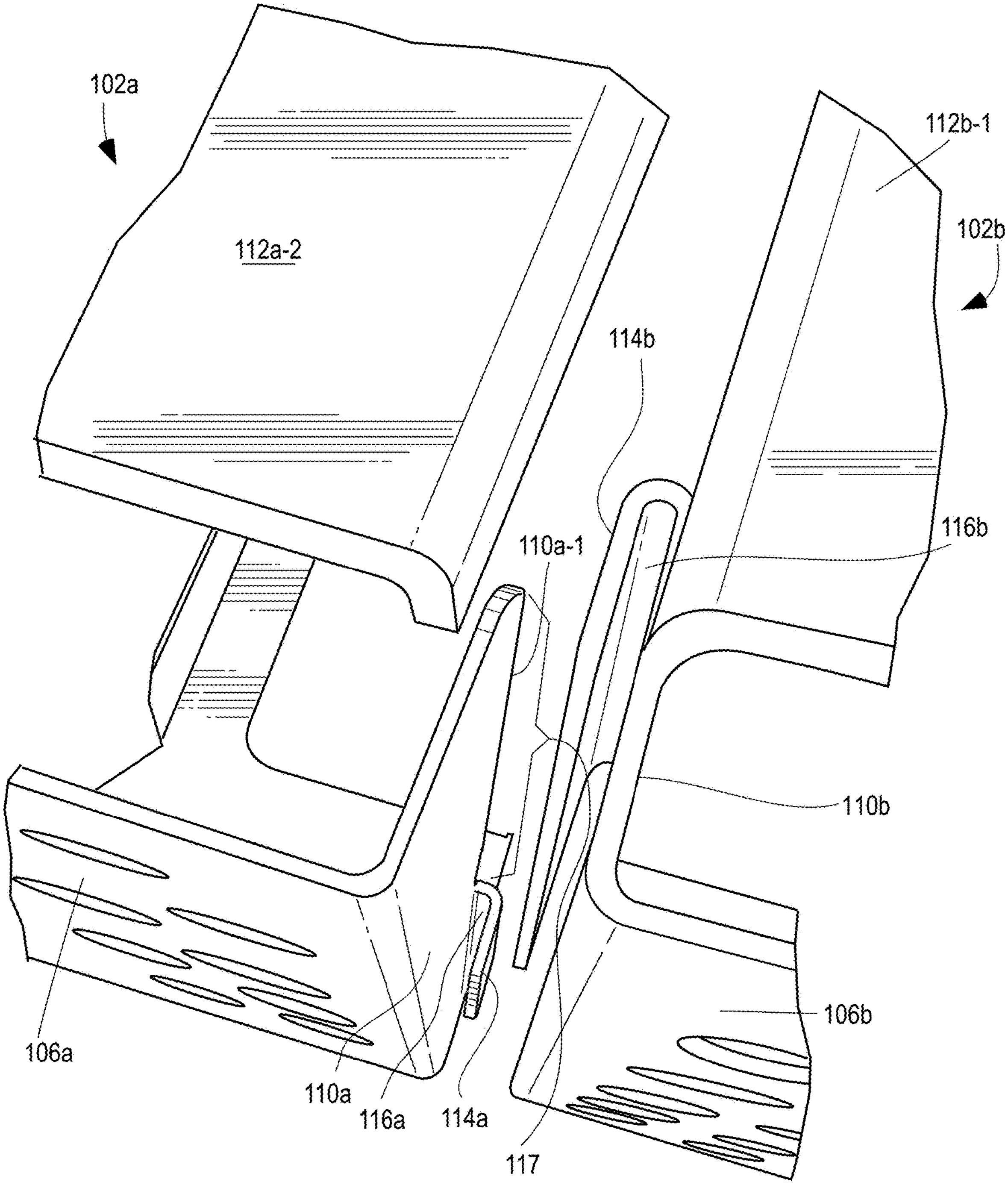
FIG. 5 is a perspective view of the undersides of the first and second body members of the furniture item of FIG. 1.

The first and second body members 102*a*, 102*b* are identical to one another such that when the interfacing side edges 106-3 of the top portions 106 of the body members 102 face one another as shown in FIGS. 3 and 5, the receiving wall slot 116 of each body member 102 is aligned with a corresponding engaging portion 116 of the wall 110 of the other body member 102.

In the illustrated embodiment, a securing member 118 is used to secure the body members 102 together as shown in FIG. 2. Specifically, the first and second side surfaces 112-1, 112-2 include first and second planar members 120-1, 120-2, respectively, extending inwardly adjacent to the interfacing side edge 106-3. When the first and second body members 102 are interconnected, the first planar member 120*a*-1 of the first body member 102*a* is positioned against the second planar member 120*b*-2 of the second body member 102*b*. Similarly, the second planar member 120*a*-2 of the first body member 102*a* is positioned against the first planar member 120*b*-1 of the second body member 102*b*. Each planar member 120 includes an opening 120-3 for receiving the securing member 118. In the illustrated embodiment, the securing member is a wing nut and threaded bolt. Hand tightening of wing nut upon the bolt secures the first and second body members 102*a*, 102*b* together, restricting movement of the interlocking components 104*a*, 104*b* out of engagement.

The interlocking component 104 uses no added fasteners or hardware whatsoever to bring the two body members together. No special tools or skills are needed to assemble this furniture item according to the present disclosure. Assembly therefore requires no welds, glues, slides, braces, fasteners, etc., whatsoever to bring the interlocking furniture item together. Through a series of cuts, bends, or folds, a first and second furniture portions are integral to each other and when secured together are inseparable from each other. Each body member 102 is identical to the other body member 102 to accomplish interlocking and joining, with sufficient strength once joined to accommodate any large or heavy object. The furniture item 100 can also be integrated with a unibody structure with a portion of a top or seat along with some but not all legs, feet, channels or sliders.

In most cases, the entire item can be made simply of two identical pieces 102, such as the formation of a stool or table furniture item. The furniture item 100 conceptually uses minimal portions as possible to perform multiple tasks. The overall aesthetics of the item is one of minimalist design and therefore minimal assembly complexity. This minimal approach allows for efficient and cost effective manufacture and assembly of a useful furniture item without compromising functionality. Each and every component of the ensuing furniture item can be produced at one facility, rather than at multiple facilities disparate from each other. Each component, or portion, is also produced using substantially similar processes, with production of an entire item at one location. Products can be produced with ease locally, close to where the markets are, and replacement products can also be produced at those market locations. No long-distance logistics or complex supply chains are needed, with no complex warehousing since the furniture item hereof has identical portions.

While the examples described in the disclosure herein utilize a furniture item 100 to demonstrate the advantages of the interlocking components 104, the interlocking components 104 may be incorporated into other structures such as, but not limited to, stools, chairs, tables, benches, sawhorses, room dividers, shelves, and step stools as well as internal and external building structures such as movable walls, interior partition systems, and floor decking to outdoor decks and platforms and roof decking.

Figure 6:
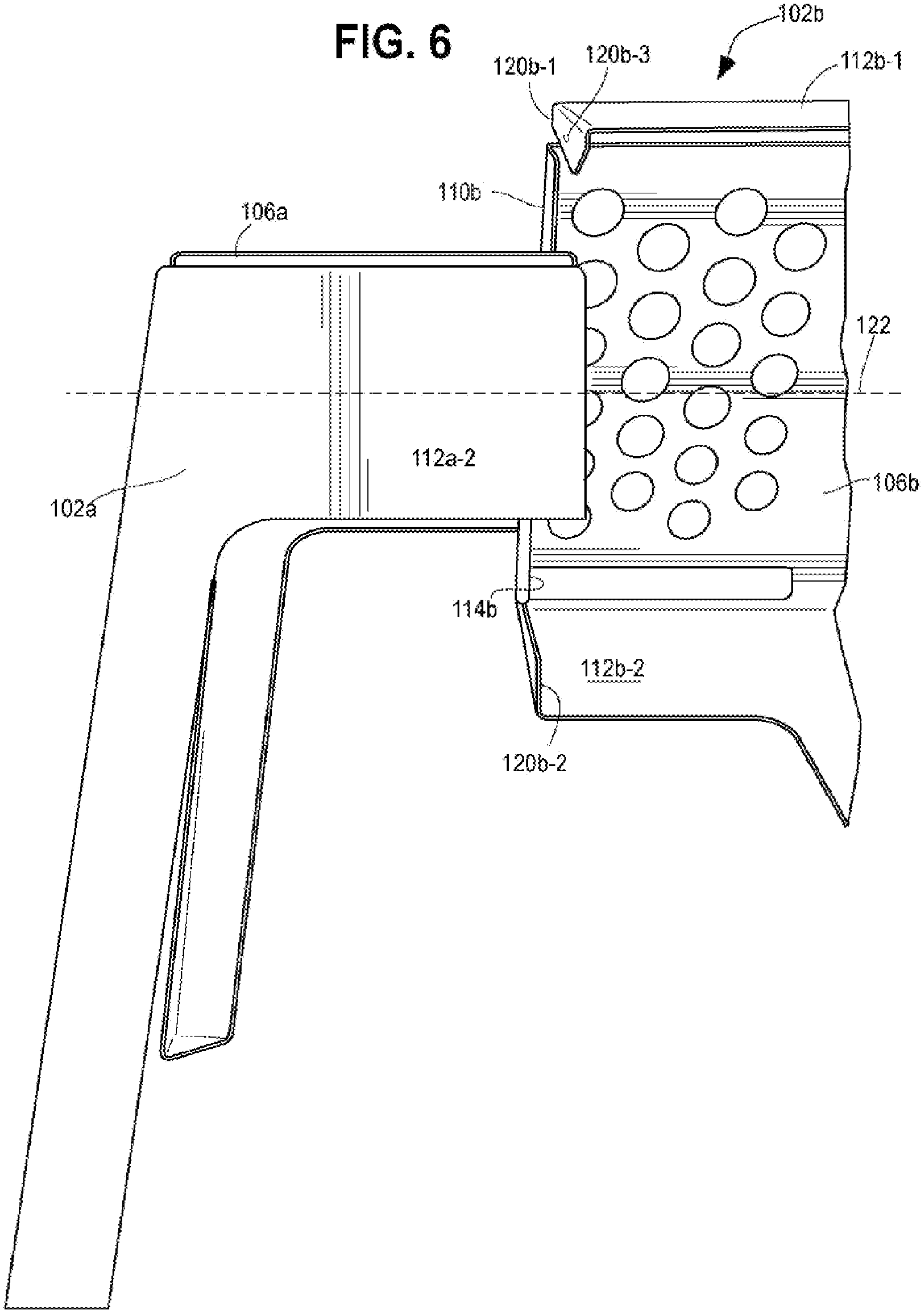
FIGS. 6-8 illustrate the process of connecting the first and second body members to form the furniture item of FIG. 1.
Figure 7:
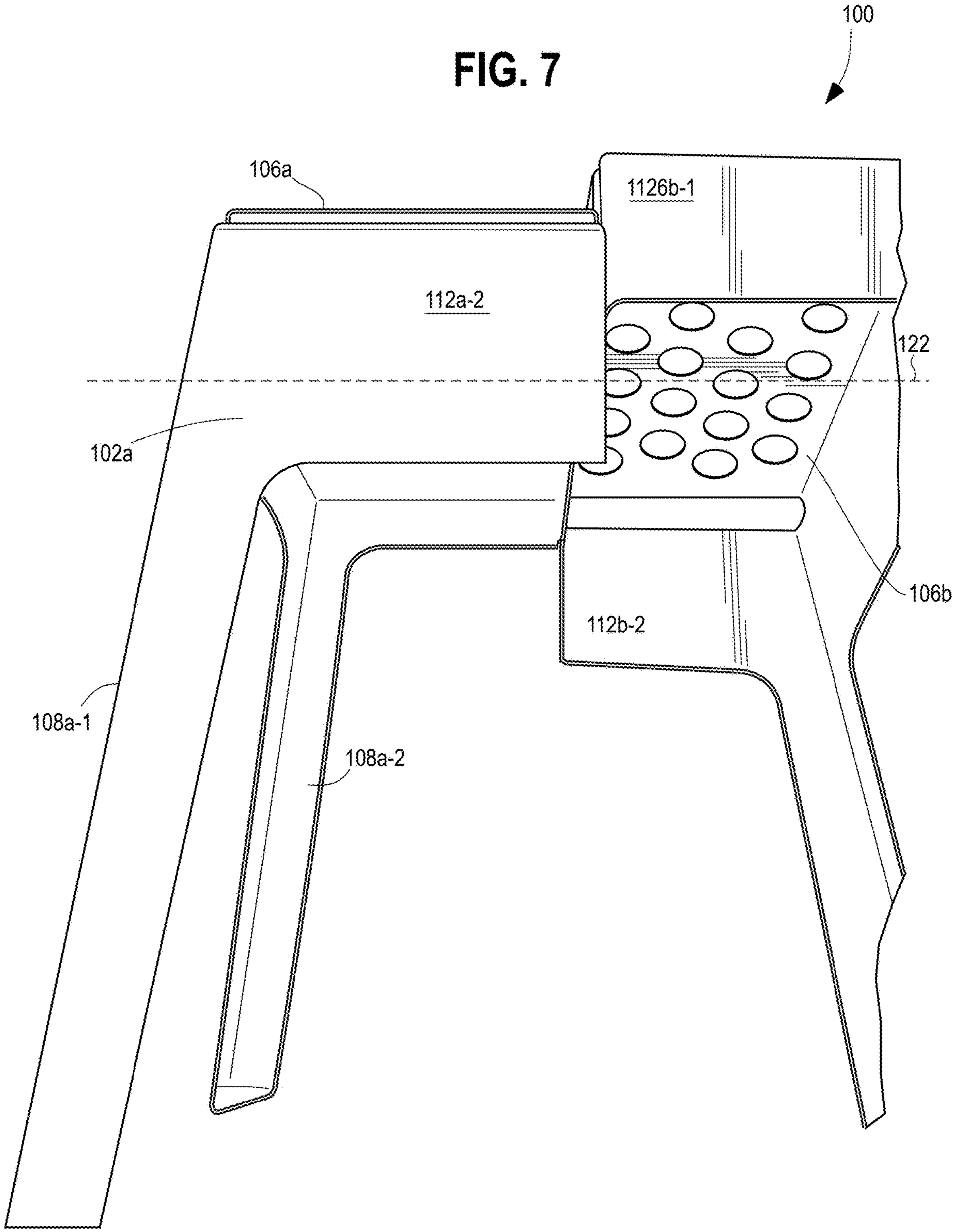
Figure 8:
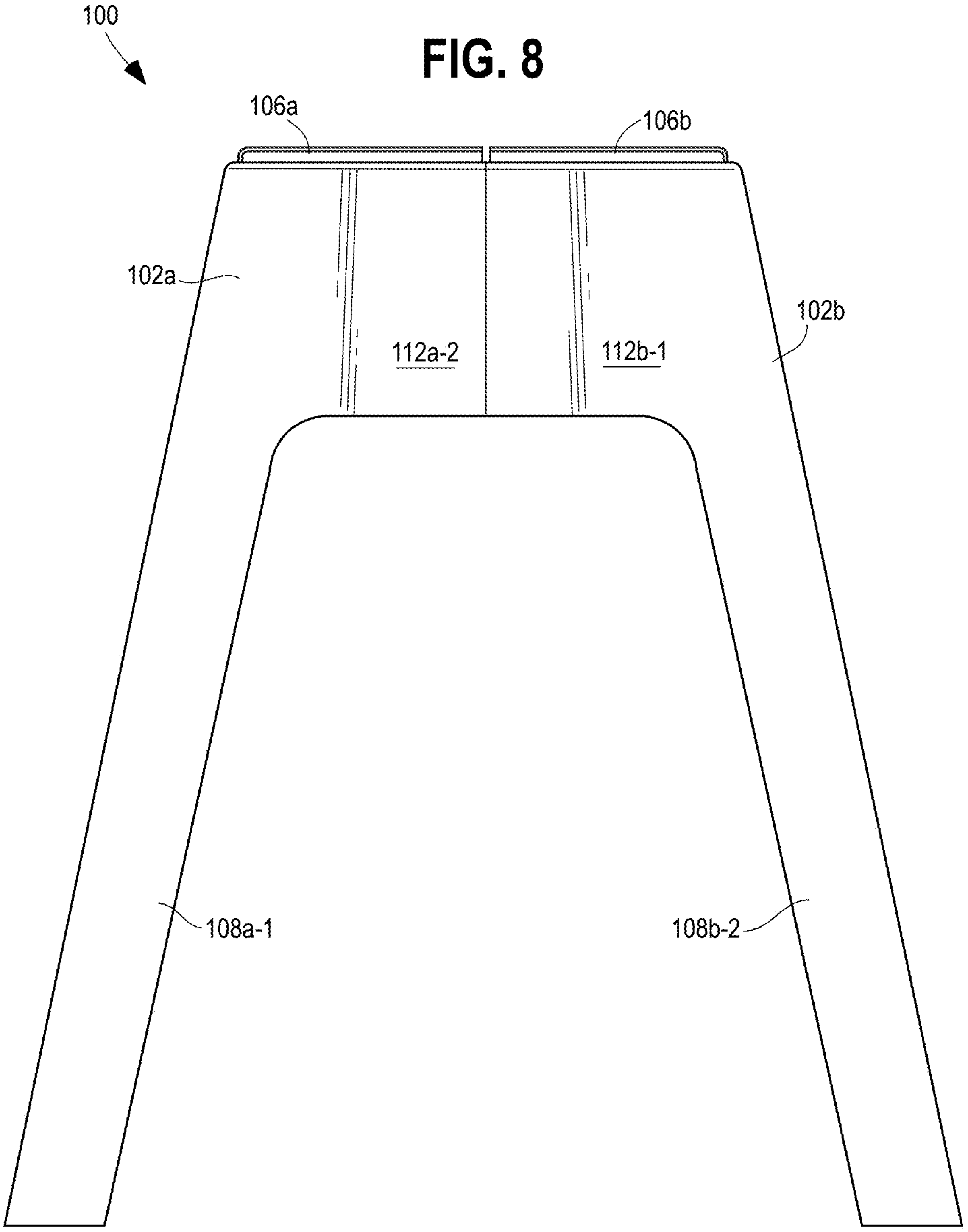

Referring now to FIGS. 6-8, a method is shown for forming the furniture item 100. Assembly of the furniture item 100 begins by arranging a first body member 102*a* against a second body member 102*b*. As will be described in more detail below, the first body member 102*a* and the second body member 102*b* have corresponding first and second interlocking components 104*a*, 104*b* that engage as the first body member 102*a* is rotated about a central axis 122 (see FIGS. 1 and 7) against the second body member 102*b*.

FIGS. 6-8 illustrate the forming sequence of the rotating and interlocking movement. In the first step illustrated in FIG. 6, the first body member 102*a* is provided, and the second body member 102*b* is positioned such that such that the second wall 110*b* of the second body member 102*b* is transverse to the first wall 110*a* (FIG. 5) of the first body member 102*a*. The second body member 102*b* is then rotated about the central axis 122 of the furniture item 100 such that the second coupling flange 114*b* receives the first engaging portion 116*a* (FIG. 5) of the first wall 110*a* and the first coupling flange 114*a* (FIG. 5) receives the second engaging portion 116*b* of the second wall 110*b* as shown in FIG. 7. After rotation has ended, the first coupling flange 114*a* extending from the first wall 110*a* of the interfacing side edge 106*a*-3 (shown as 106-3 in FIG. 4) of the first body member 102*a* will partially surround the second engaging portion 116*b* of the second wall 110*b* of the interfacing side edge 106*b*-3 (shown as 106-3 in FIG. 4) of the second body member 102*b*. Likewise, a second coupling flange 114*b* of the second wall 110*b* of the second body member 102*b* will extend partially around the first engaging portion 116*a* of the first wall 110*a* of the first body member 102*a*. The interlocking of the first and second interlocking components 104*a*, 104*b* occurs at the same time.

In some embodiments, the material used in forming the first body member is the same as that which forms the second body member. All hems and flanges, as well as any cutouts, bends, folds, etc., is integral to, continuous or contiguous with, and therefore of unibody construction for the entire first body member and also of unibody construction for the second body member. When the first and second body members are secured together through the interlocking components and securing members, the ensuing furniture item has sufficient strength to hold an object of any weight since no joints or welds are contained in either the first or the second body members.

In a further example, a wall system embodiment includes first and second enclosed compartments that require no tools, attachment, and/or removal of shelves, hardware, or sliding shutters to be attached for slide to occur. The enclosed compartments are made of two interlocking portions, which also require no welds, adhesives or hardware for assembly. The wall system therefore need not include legs as in seating or table embodiments, yet the two interlocking components of the wall shelf can flex and removably snap into each other. Accordingly, the furniture item can include a wall system shelf, as well as floor screens that are an assembly of single components that can be assembled in multiple ways to create various configurations for the floor application. Therefore, the furniture item includes a floor of a structure. Yet further, the unibody constructed, identical portions are also interchangeable across product categories. For example, shelves from the wall system can be used to supplement the utility and usefulness of food service counters and not just shelving systems.

If necessary, the two furniture portions for a product line like a stool, for example, may be dissimilar. One of the first or second body members of the stool may be taller and provide a backrest function, for example. The interlocking components as described herein would remain the same. Incorporation of new materials into the products can also require new mechanisms for integration, but the assembly will always remain removably fastened with no welds, glues, fasteners, etc. The furniture item can use labels for an identification, an example of which is a laser-cut identification alphanumeric label into the product itself.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various furniture portions, values of parameters, mounting or assembly arrangements, use of materials, colors, orientations, etc.) without materially departing from the novel teachings and advantages of the subject matter described herein. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes, and omissions may also be made in the design, operating conditions and arrangement of the various example embodiments without departing from the scope of the present invention.

As used herein and in the appended claims, the singular form of a word includes the plural, unless the context clearly dictates otherwise. Thus, the references "a," "an" and "the" are generally inclusive of the plurals of the respective terms. For example, reference to "a feature" can include a plurality of such features. The term "and/or" used in the context of "X and/or Y" should be interpreted as "X," or "Y," or "X and Y."

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly to one another. Such joining may be stationary (e.g., permanent) or moveable (e.g., removable or releasable). Such joining may be achieved with the two members or portions, with each portion being integrally formed as a single unitary body coupled directly with the other single unitary portion.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed is:

1. A structure comprising:

a first body member including a first wall forming a first interconnecting component in which a first portion of the first wall forms a first coupling flange including a first receiving wall slot; and a second body member including a second wall forming a second interconnecting component in which a first portion of the second wall forms a second coupling flange including a second receiving wall slot;

wherein the first interconnecting component engages with the second interconnecting component to secure the first body member and the second body member together, in which the first coupling flange surrounds a second engaging portion of the second wall and the second coupling flange surrounds a first engaging portion of the first wall.

2. The structure of claim 1, wherein each of the first coupling flange and the second coupling flange are U-shaped.

3. The structure of claim 2, wherein the first coupling flange is formed along half of the first wall and the second coupling flange is formed along half of the second wall.

4. The structure of claim 1, wherein the first body member is of a unibody construction that is a first half of the structure, and wherein the second body member is of a unibody construction that is a second half of the structure.

5. The structure of claim 1, wherein the second body member is identical to the first body member.

6. The structure of claim 1, wherein each of the first and second body members includes a top portion, wherein each top portion includes a side surface extending from the top portion adjacent to the interfacing side edge, wherein the side surface includes a planar member extending toward the respective interfacing side edge, and wherein each planar member includes an opening.

7. The structure of claim 6, wherein the openings of abutting planar members align when the first and second interconnecting component of the first and second body members are secured together, and further comprising a securing member positioned within the aligned openings of the abutting planar members.

8. The structure of claim 7, wherein the securing members comprise a threaded bolt and wing nut.

* * * * *